UNITED STATES PATENT OFFICE.

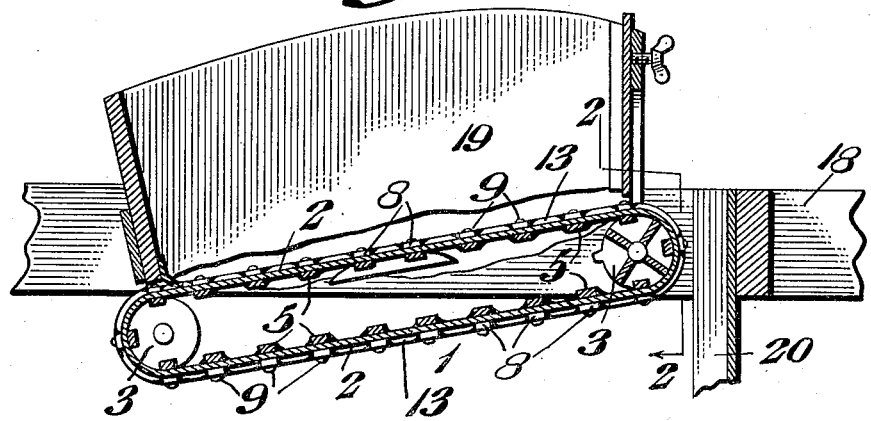

WILLIAM A. HENDRICKSON, OF RIVERTON, NEW JERSEY, ASSIGNOR TO McWHORTER MANUFACTURING COMPANY, OF RIVERTON, NEW JERSEY, A CORPORATION OF NEW JERSEY.

FERTILIZER-DISTRIBUTER.

1,346,650.

Specification of Letters Patent.

Patented July 13, 1920.

Application filed April 28, 1919. Serial No. 293,253.

*To all whom it may concern:*

Be it known that I, WILLIAM A. HENDRICKSON, a citizen of the United States, residing in the city of Riverton, county of Burlington, and State of New Jersey, have invented a new and useful Fertilizer-Distributer, of which the following is a specification.

In a prior Patent No. 1,134,688, granted April 6th, 1915, there is shown, described and broadly claimed a novel construction of fertilizer distributer, embodying an endless belt and transverse bars having hooked ends arranged in pairs whose terminals are deflected toward each other, and connecting means or links which engage said hooked ends so as to cause the parts thus assembled to travel or operate as a unit in unison.

I have found from practical experience that it is desirable in devices of this general character to dispense with the hooked terminals above referred to and to employ transverse bars having bifurcated or forked ends which are straight and recessed or notched near their terminals, so as to form terminal heads which retain in position outer oblong washers, which prevent the inner links connecting a pair of said straight ends from disengagement therewith, the pins of each adjacent pair of bars being engaged by an inner link, which latter are so retained in position that the relative position of the outer ends of all the transverse bars attached to the distributer belt is always positively determined, there is no liability of stretching the apron and there is furthermore, no liability of the inner links connecting the outer ends of the bars slipping off said ends, which might happen in the construction of the prior art aforesaid in case the belt becomes contracted.

To the above ends, my invention consists of a novel construction of fertilizer distributer and its adjuncts and particularly the connecting devices therefor whereby the outer straight ends of the transverse bars attached to the distributer belt or apron are properly connected spaced apart, and prevented from disengagement from their links under all conditions.

For the purpose of illustrating my invention, I have shown in the accompanying drawings one form thereof which is at present preferred by me, since the same will be found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a vertical sectional view of a fertilizer distributer embodying my invention, the section being taken on line 1—1 Fig. 2.

Fig. 2 represents a section on line 2—2 Fig. 1.

Fig. 3 represents, on an enlarged scale, a plan view of a portion of the distributer belt or apron, showing the manner of connecting and spacing the outer straight terminals of the transverse bars carried by said apron.

Fig. 4 represents a side elevation of Fig. 3.

Fig. 5 represents a perspective view of my novel construction of cross bar before the same is assembled with respect to the belt or apron.

Fig. 6 represents a side elevation of one of the outer oblong washers employed before being bent into the shape seen in Fig. 4.

Similar numerals of reference indicate corresponding parts in the figures.

Referring to the drawings:—

1 designates my novel construction of fertilizer distributer, the same comprising an endless belt or apron 2, which is rotatably mounted upon or driven by the sprocket wheels 3, which are supported and actuated in any suitable manner. The endless apron 2 has secured thereto the transverse bars 4 which comprise the body portion 5 having the spurs 6 projecting therefrom, the upper surface 7 of said body portion being placed against the underside of the endless apron or belt 2 so that the spurs 6 pass therethrough and have placed thereon washers 8 after which the ends of the spurs 6 are headed, expanded or riveted on by any suitable implement, so that they appear as at 9, thereby retaining said washers 8 in position, as will be understood from the patent aforesaid and from Figs. 2 and 3 herein.

The outer ends of the transverse bars 4 which may be of any desired number are bifurcated or forked, so as to terminate in the round arms or pins 10, which are straight and near their outer ends are provided with the recesses or notches 11, thereby forming the terminal heads 12. It will be seen that when the transverse bars 4 are assembled with respect to the apron 2, the parts will assume the position seen in Fig. 3 and each juxtaposed pair of pins or arms 10 of a separate pair of bars is engaged by the inner links 13, one of the latter engaging a pair of the straight pin like arms 10 for each pair of bars 4, while the thin oblong outer washers 14 engage the outer recesses 11 of each pair of straight pins 10, which are integral with a bar 4. The oblong outer washers 14 which engage each pair of notches 11 of each bar appear initially as seen at 15 in Fig. 6, but after being placed in position on the notches 11 of the straight pins 10 as seen in Fig. 4, the bottom member 16 of each of said washers is deflected or pinched inwardly on its narrow edge by a suitable implement, so as to appear as seen at 17 in Fig. 4, whereby said outer oblong washers 14 are caused to positively engage the recesses 11 and being held in position by the terminal heads 12, thereby prevent the inner links 13 which connect a pair of adjacent bars from slipping off the ends of the pins 10, which is liable to happen in the construction of the prior patent aforesaid.

It will be apparent from the foregoing that the transverse bars 4 are properly spaced with respect to each other and to the apron 2 by means of the inner links 13 and by the employment of the outer oblong washers 14 best seen in Figs. 3 to 5, the inner links 13 are positively prevented from disengagement with the pins 10 under any conditions.

I have deemed it unnecessary to describe in detail the frame 18, hopper 19 and the chute 20 of the distributer, as the construction and location of these parts will be apparent to those skilled in this art and will be clearly understood from the prior patent aforesaid, my present invention appertaining particularly to the fertilizer apron and its adjuncts, *per se*, and particularly to the construction of the terminals of the transverse bars 4 and the collocation of the outer oblong washers 14 on the recesses 11 in the ends of the straight pin members 10, whereby the inner links 13 are prevented from becoming disengaged from their respective bars.

It will be understood that by my invention, the belt is prevented from stretching unduly and that by reason of the loose movable connection between the links 13 and the straight integral arms or pins 10 of the transverse bars 5, the fertilizer cannot lodge between the same and clog up the parts, whereby the possibility of rusting of the parts is obviated which is liable to occur when there is a close fit between the parts or where a chain is employed without a loose movable connection.

It will now be apparent that I have devised a novel and useful construction of a fertilizer distributer, which embodies the features of advantage enumerated as desirable in the statement of the invention and the above description, and while I have, in the present instance, shown and described a preferred embodiment thereof which will be found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In a device of the character stated, an endless belt, means for actuating it, transverse bars secured to said belt and having terminal straight pins at each end thereof, inner links common to a pair of pins of a pair of adjacent bars, and outer oblong washers secured to a pair of pins of each bar for retaining said inner links in position.

2. In a fertilizer distributer, a feed belt, bars extending across said belt at intervals, means for securing said bars and belt together, a pair of straight pins on the ends of each bar, inner links common to the pins of a pair of bars, and outer oblong washers upon each pair of pins of each bar for preventing said links from disengagement with said pins.

3. In a fertilizer distributer, a feed belt, transverse bars extending across said belt at intervals and having flat faces contiguous to said belt, means for securing said bars and belt together, straight pins at each end of said bars, a connecting link common to the pins of adjacent bars, and outer oblong washers engaging notches in said pair of pins on each bar.

4. In a fertilizer distributer, an endless feed belt, transverse bars secured thereto, spaced apart and each terminating in a pair of notched pins, said bars having flat surfaces contiguous to said belt, a series of spurs projecting from said flat surfaces and extending through said belt, inner links engaging a pair of pins of different bars, and outer oblong washers engaging the notches of a pair of spurs of each bar.

5. In a fertilizer distributer, a feed belt, bars extending across said belt at intervals and suitably secured thereto, engaging means having notches therein carried at each end of said bars, a connecting link extending between adjacent bars with one of the engaging means of the adjacent bars movably embraced by and normally seated in the ends of the link, and outer oblong washers seated in said notches whereby free rotary movement at the engagement is insured.

6. In a fertilizer distributer, an endless apron, a plurality of transverse bars secured thereto, each terminating in a pair of straight pins notched at their ends to provide terminal heads, inner links engaging a pair of pins of adjacent bars, and outer oblong washers engaging a pair of pins of each bar.

WILLIAM A. HENDRICKSON.

Witnesses:
E. HAYWARD FAIRBANKS,
C. D. McVAY.